J. J. GREENOUGH.
Cloth-Measuring Apparatus.
No. 161,877. Patented April 13, 1875.
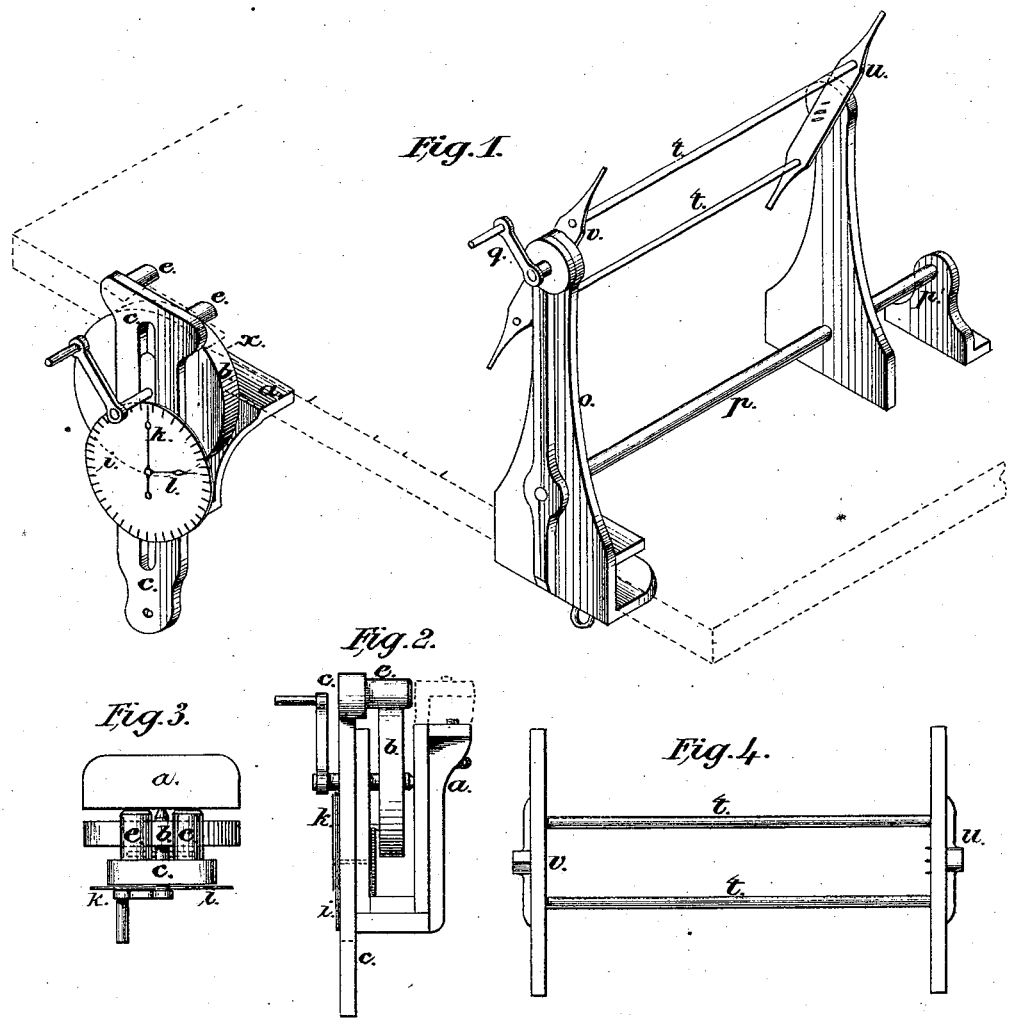
Witnesses:
Peter B. McLennan
Thos Wills
Inventor:
J. J. Greenough

UNITED STATES PATENT OFFICE.

JOHN JAMES GREENOUGH, OF SYRACUSE, NEW YORK.

IMPROVEMENT IN CLOTH-MEASURING APPARATUS.

Specification forming part of Letters Patent No. 161,877, dated April 13, 1875; application filed September 9, 1874.

*To all whom it may concern:*

Be it known that I, J. JAMES GREENOUGH, of Syracuse, Onondaga county, New York, have invented an Apparatus for Measuring and Putting up Dry Goods, &c., of which the following is a specification:

My invention is designed to facilitate measuring cloth, ribbon, or other dry goods of any width or length, and to secure the greatest accuracy therein, for retail or wholesale purposes, taking stock, &c.

The following is a description of my said invention, referring to the accompanying drawing, in which Figure 1 is a general view of the measuring apparatus and reel or winder, the table shown by dotted lines. Fig. 2 is a side view of the measuring apparatus. Fig. 3 is a top plan; Fig. 4, the folding-reel.

The apparatus consists of a frame, $a$, which can be attached to a proper support on or under the table or counter. In this frame the measuring-wheel $b$ is hung; it may be of any desired size, but for ordinary measuring I prefer to have it just one yard in circumference, (eleven and one-half inches diameter.) The periphery of this wheel should be some three inches broad, more or less, but may be extended to the breadth of the goods to be measured, if deemed desirable; or a succession of rollers may be used in line to make out the breadth. The measuring-wheel $b$ is placed at or near the inner edge of the counter, with its upper surface projecting above the top of the table or counter, in which there may be an opening for the purpose. The wheel $b$ may be hung on centers or other bearings, so as to turn freely. In front of the wheel there is a slide, $c$, that moves up and down by means of a lever or treadle below. In this slide $c$ are affixed two studs, that project over the measuring-wheel and form the axes of rollers $e$, which rest upon and hold down the goods to be measured upon the measuring-wheel $b$; (one roller may be substituted for the two in the slide, but I prefer two to insure accuracy.) On the face of the frame $a$ I affix an index-face, $i$, with any required number of equal divisions upon its outer circle, say fifty, more or less, with a pointer, $k$, mounted on an axis at its center. This axis extends back to the measuring-wheel, and bears on its inner end a toothed wheel, with which a cog or pin on the measuring-wheel hub comes in contact, so as to move the pointer one division for every revolution of the measuring-wheel. Another similar pointer, $l$, may be affixed to an axis passing through the center of that of pointer $k$. These two pointers can be coupled together in any relative position to each other around the circle. On the inner end of the shaft of pointer $l$ I place an alarm wheel or arm, which comes in contact with an alarm of any cheap and convenient construction, by means of which the number of yards to be measured will be noted; or the alarm pointer and wheel may be omitted, and the cog on the measuring-wheel may strike a click at each revolution. To measure with this apparatus the index-pointer is set at zero, the small rollers $e$ are raised, and the measuring-roller thereby brought into place to begin to measure. The edge of the goods is slipped under the rollers $e$, upon the measuring-roller $b$, with the end at a fixed mark, $x$, upon the counter; the small rollers $e$ are dropped upon the goods, and bear them down in contact with the measuring-roller $b$; they are then drawn through and revolve the measuring-wheel until the proper number of yards are measured; the piece is then cut off at the mark $x$, from which the measuring commenced. Fractions of a yard may be measured by permanent marks upon the counter or by the measuring-wheel. Instead of drawing the goods through the apparatus by hand, as above noted, the measuring-wheel may be turned by a crank and carry the goods through, the other parts of the apparatus being the same as before described. Needle-points or other irregularities on the surface of the measuring-wheel may be made, if found desirable, to insure the moving of the goods and the surface of the wheel in unison without slipping. In cases where the goods are to be rolled up I use the following device, the general principles of which are now in common use for reeling and winding, the specific construction alone being new, for cheapening the construction and readily and conveniently adapting it for the purpose of combining it with the measuring apparatus:

My reel consists of an upright standard, $o$, which I clamp to a permanent support, usually the counter or table to which the measuring-wheel is affixed. From this standard a horizontal rod, $p$, projects. At the top of standard $o$ there is a journal-bearing for a short horizontal mandrel or shaft, on which a hand-crank, $q$, is affixed, and on the opposite end a dog or other device to hold the reel board or roller that the goods are to be wound on. This may be a plain, flat board, or round roller of wood, if it is to remain in the goods; or a reel (shown in Fig. 4) may be used, which can be collapsed and removed from the goods after they are wound up, if desired. This reel consists of two bars, $t\ t$, and short arms $u\ v$, standing at right angles to the long ones, and having a proper device at the center of $u$ to couple it with the mandrel above named. Arm $v$ is of similar length to the short arm $u$, as seen in Fig. 4. The ends of the bars pass through eyes in the short arms $u\ v$, and, when fastened, form with them a rectangular frame. To collapse this frame after the goods have been wound on it, the fastening is removed and the arms $u\ v$ drop apart; they can then be readily withdrawn. At the center of arm $v$ there is a socket that fits onto a center point, $r'$, projecting from a standard, $r$, on a line with the crank-mandrel. This standard $r$ slides on the rod $p$ and can be fastened thereto at any desired distance from standard $o$ by a set-screw. The extreme end of the rod $p$ has a clamp or other proper fastening, $p'$, to hold it to the support. Guides or shields $g$ can be projected at one or both ends of the reel frame, board, or roller, to guide the goods evenly while being wound on. To wind the goods up as they are measured they pass from the measuring-wheel directly under the rod $p$, which prevents them from being lifted off of the measuring-wheel, and thence up onto the reel. If it becomes desirable to speed up the mandrel or reel, it can be done by a pinion on the mandrel and spur-wheel below, with the hand-crank on it, or with a pulley on the mandrel and a band-wheel; but these devices are so familiar to the mechanician as to need no specific description.

Having thus described my improvements in measuring and putting up goods, I claim—

1. The frame $a$, supporting the measuring-wheel, by means of which the said wheel is affixed to a table or counter, with its upper part just above the level thereof, and the slide $c$ connected therewith, bearing stud-rollers $e$ above, and resting upon said measuring-wheel constructed and arranged as and for the purposes specified.

2. The reel composed of metal head $u\ v$ and removable bars $t\ t$, by which the reel is collapsed, as herein described.

JOHN JAMES GREENOUGH.

Witnesses:
THOMAS WILLS,
PETER B. McLENNAN.